Jan. 27, 1953 — T. G. HUNT — 2,626,447
ROPE CONNECTION
Filed Aug. 8, 1949
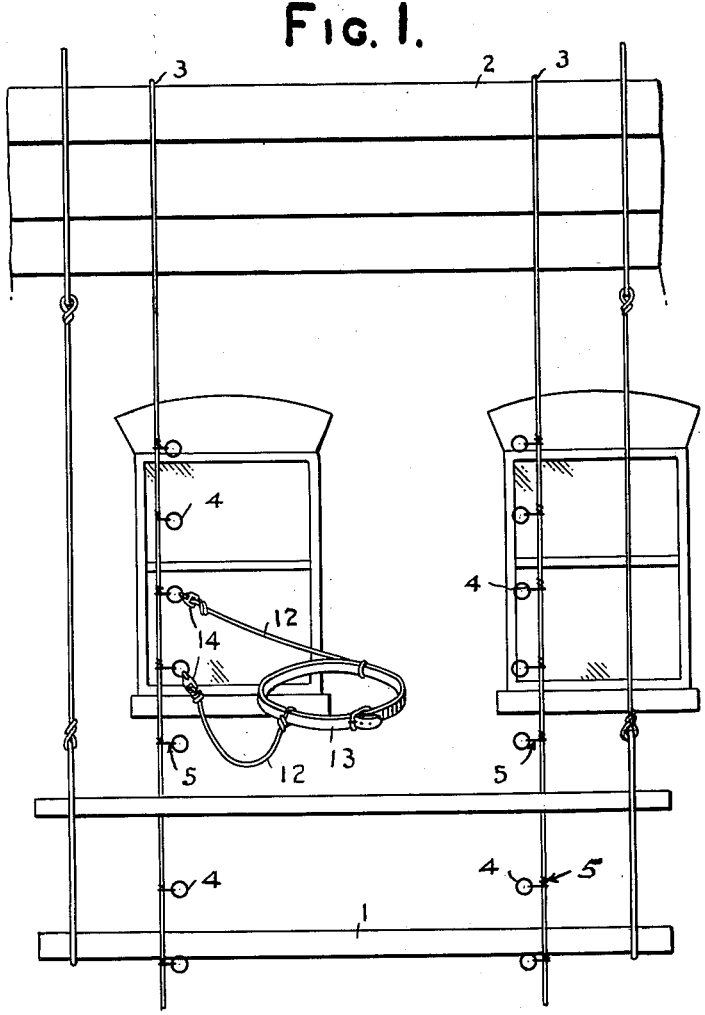
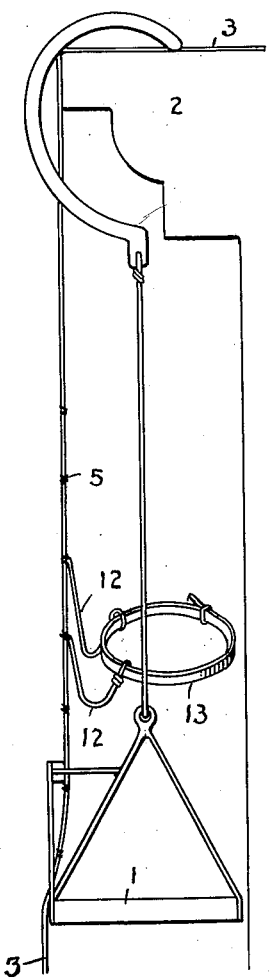
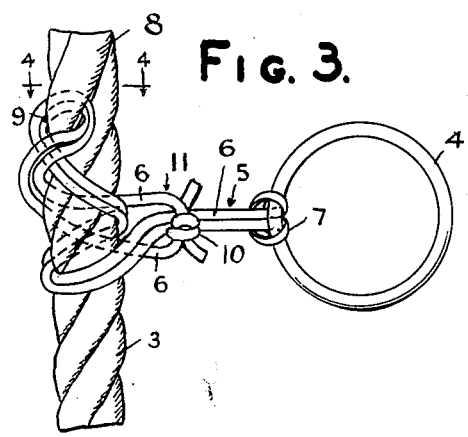
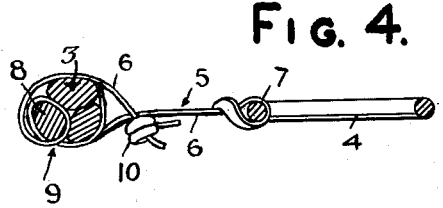
INVENTOR,
THOMAS G. HUNT.
BY
*E. E. Vrooman & Co.,*
ATTORNEYS.

Patented Jan. 27, 1953

2,626,447

UNITED STATES PATENT OFFICE 2,626,447

ROPE CONNECTION

Thomas G. Hunt, Seat Pleasant, Md.

Application August 8, 1949, Serial No. 109,086

1 Claim. (Cl. 28—78)

This invention relates to a life saving device.

An object of this invention is to provide efficient means for saving the lives of painters.

Another object of this invention is the provision of a safety device which will allow free movement of the painter on an ordinary platform, while at the same time he is prevented from injury should said platform break, or become unusable for any reason.

A still further object of this invention is to provide for each ordinary platform two hanging ropes, each having metal rings fixedly fastened thereto by a novel construction, and the two-rope device adapted to allow two (or one) painters to attach themselves to said rings, whereby no accident to the platform will cause injury to the painter or painters.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Fig. 1 is a view in front elevation of a device constructed in accordance with the present invention.

Fig. 2 is a view in side elevation.

Fig. 3 is an enlarged fragmentary side view of one of the metal rings showing distinctly how it is fastened to the rope by the novel lacing.

Fig. 4 is a horizontal sectional view taken generally on the line 4—4, Fig. 3 and looking in the direction of the arrows.

Referring to the drawings, in which the preferred embodiment of this invention is illustrated, I designates an ordinary platform which is suspended on the building 2 by any ordinary means. This invention comprises two hanging ropes 3. The term "rope" is used in a broad sense, meaning any kind of a hemp or wire rope or cable susceptible of carrying out the present invention. A plurality of metal rings 4 are attached to each rope 3 by means of a lacing 5. The lacing 5 is formed from one piece of suitable material, such as raw hide, and is doubled to produce portion 6, Fig. 3. These portions 6 are formed into a loop 7 around ring 4, and then the portions 6 are wrapped around the rope 3, and then are wrapped around one of the strands 8 of rope 3, as seen at 9 in Fig. 3. Then the strands 6 are tied into a knot 10 contiguous to the ring 4. Thus the tying of knot 10 forms a loop at 11, and within this loop are portions 6 contiguous to said ring 4. It is to be understood that by this novel lacing that each ring 4 is fixedly secured to the rope 3, with the ring 4 extending inwardly for facilitating the attaching of the guy straps 12 to the rings 4. Further, the rings on both of the ropes 3 extend inwardly or towards the center of the platform 1 which permits one painter, if he desires, to attach the guy straps 12 to the rings of both ropes 3, whereby the painter would then be provided with a swing in case of accident. It is to be understood that each guy strap 12 is fastened at its inner end to a body belt 13, and the other end of said guy strap is fastened by means of a snap 14 to the ring 4.

When two painters are working upon platform I each can be secured to a rope 3 by being provided with a body belt 13 and guy straps 12. Free movement of a painter is allowed on the platform I while being provided with this safety device.

It is essential that two of the ropes 3 with their equipment be provided for each platform I because it is customary for two painters to work on a single platform.

The hanging ropes 3 are attached at their upper ends to any suitable part of building 2, such as a chimney, or a substantial projecting portion of the building, not shown.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In a device of the kind described, the combination of a rope, said rope being of the type known as stranded and consisting of a plurality of strands twisted together, a strap doubled intermediate its ends, the end portions of the strap being wrapped around said rope in more than one turn and then passed around one strand of the rope between the one strand and the remaining strands thereof to form a loop, said ends being then wrapped around the rope and around themselves adjacent the double portions and there secured by a knot.

THOMAS G. HUNT.

REFERENCES CITED

The following references are of record in the file of this patent:

UNITED STATES PATENTS

| Number | Name | Date |
| --- | --- | --- |
| 1,442,531 | Mather et al. | Jan. 16, 1923 |
| 1,448,348 | Hodgson | Mar. 13, 1923 |
| 2,166,809 | Frankel | July 18, 1939 |
| 2,232,163 | Brecht | Feb. 18, 1941 |
| 2,303,954 | Roke | Dec. 1, 1942 |

OTHER REFERENCES

"Encyclopedia of Knots and Fancy Rope Work," Graumont and Heusel (1945), Cornell Maritime Press, New York; splice No. 9, page 620, plate 331; splice No. 197, page 482, plate 262.